(12) United States Patent
Shaw

(10) Patent No.: US 8,934,863 B2
(45) Date of Patent: Jan. 13, 2015

(54) SYSTEMS AND METHODS FOR PROVIDING ANONYMOUS MESSAGING

(71) Applicant: AT&T Intellectual Property I, L.P., Atlanta, GA (US)

(72) Inventor: Richard Shaw, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/181,919

(22) Filed: Feb. 17, 2014

(65) Prior Publication Data

US 2014/0162615 A1    Jun. 12, 2014

Related U.S. Application Data

(63) Continuation of application No. 12/277,631, filed on Nov. 25, 2008, now Pat. No. 8,655,311.

(51) Int. Cl.
| | |
|---|---|
| *H04M 3/16* | (2006.01) |
| *H04M 3/42* | (2006.01) |
| *H04L 12/58* | (2006.01) |
| *H04W 4/12* | (2009.01) |
| *H04W 4/14* | (2009.01) |
| *H04W 4/16* | (2009.01) |

(52) U.S. Cl.
CPC .......... *H04M 3/42008* (2013.01); *H04L 51/38* (2013.01); *H04W 4/12* (2013.01); *H04L 51/28* (2013.01); *H04L 51/14* (2013.01); *H04W 4/14* (2013.01); *H04W 4/16* (2013.01)
USPC ........................................................ 455/410

(58) Field of Classification Search
USPC ........................................................ 455/410
See application file for complete search history.

(56) References Cited

U.S. PATENT DOCUMENTS

| 7,379,913 B2 | 5/2008 | Steele et al. | |
| 2004/0010446 A1* | 1/2004 | Vanska et al. | ................... 705/14 |

* cited by examiner

*Primary Examiner* — Joel Ajayi
(74) *Attorney, Agent, or Firm* — Hartman & Citrin LLC

(57) ABSTRACT

An exemplary messaging anonymity system (MAS) for providing anonymous messaging between a mobile device and a third-party service provider via a communications network can include a processor, a network interface, and a memory. The memory can be configured to store instructions that, when executed, perform the steps of an exemplary method. The exemplary method can include receiving a mobile-originated (MO) message from a mobile device, the MO message being destined for a third-party service provider, determining to provision an anonymous subscriber identification (ASI) to be used in lieu of a subscriber address associated with the mobile device, provisioning the ASI, and sending the MO message to the third-party service provider, wherein the ASI is presented to the third-party service provider as an originating subscriber address.

14 Claims, 8 Drawing Sheets

SYSTEMS AND METHODS FOR PROVIDING ANONYMOUS MESSAGING

TECHNICAL FIELD

The present disclosure relates generally to communications and, more particularly, to systems and methods for providing anonymous messaging communications.

BACKGROUND

Wireless telecommunications services, such as voice, data, and messaging, provide users with communications access within a coverage area. These services allow users to communicate without the need for a landline thereby offering superb flexibility over landline communication solutions.

Many people are foregoing landline services, such as landline telephone service, in favor of a wireless service for all their communications needs. In addition to voice service, many users have adopted messaging communication services, such as short message service (SMS) messaging, enhanced message service (EMS) messaging, and multimedia message service (MMS) to communicate with others. The convenience offered by these messaging services has garnered a large following among wireless service users, but has especially impacted communication habits of young, technologically astute demographics, such as high school and college aged persons. The wide-spread appeal of SMS service has fostered the creation of more advanced services like MMS, which allows users to append a sound, an image, a video or other media to a text message.

The popularity of messaging services has been leveraged by many third-party service providers as a way to distribute content, such as ringtones, images, videos, music, games, and other content to wireless users. For example, many third-party service providers offer service whereby a user can message the provider using a specific character string and short code to acquire content. Messages sent by a user as a request for content are sent in the clear with no encryption or other mechanism to preserve anonymity. This practice may compromise a user's identity, network integrity, and/or consumer confidence in a wireless service provider.

SUMMARY

Systems for providing anonymous messaging between a mobile device and a third-party service provider and methods for operating such systems are described herein. In one embodiment of the present disclosure, a method for operating a message anonymity system (MAS) to provide anonymous messaging between a mobile device and a third-party service provider via a communications network can include receiving a mobile-originated (MO) message from the mobile device. The MO message can include a destination address for a third-party service provider. The method can further include determining to provision an anonymous subscriber identification (ASI) to be used in lieu of a subscriber address that is associated with the mobile device, provisioning the ASI, and sending the MO message to the third-party service provider. The ASI can be presented to the third-party service provider as the originating subscriber address. The originating subscriber address can include, but is not limited to, a subscriber's telephone number, a mobile subscriber integrated services digital network number (MSISDN), a device uniform resource locator (URL), or other address that is associated with the mobile device.

In some embodiments, the MO message can be generated and sent to the MAS by the mobile device in response to a mobile-terminated (MT) message from the third-party service provider being received at the mobile device. In some embodiments, the MO message is a spontaneous message generated and sent in response to the MT message being received. In other embodiments, the MO message is automatically generated at the mobile device in response to the MT message being received. In still other embodiments, the MO message is manually created by the subscriber.

In some embodiments, the method includes determining to automatically provision an ASI to be used in lieu of the subscriber address that is associated with the mobile device by randomly assigning the ASI. The ASI can be assigned for use in one or more messaging communications. The ASI can be valid for one messaging communication or one or more future messaging communications.

In some embodiments, the method includes determining to automatically provision the ASI to be used in lieu of the subscriber address associated with the mobile device by assigning the ASI based upon ASI selection criteria. The ASI selection criteria can include a wireless service provider preference and/or a subscriber preference.

In another embodiment of the present disclosure, a MAS for providing anonymous messaging between a mobile device and a third-party service provider via a communications network can include a processor, a network interface, and a memory that is in communication with the processor. The memory can be configured to store instructions that, when executed, perform the steps of the aforementioned method.

In another embodiment of the present disclosure, a computer-readable medium that includes computer-executable instructions that, when executed, can perform the steps of the aforementioned method.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
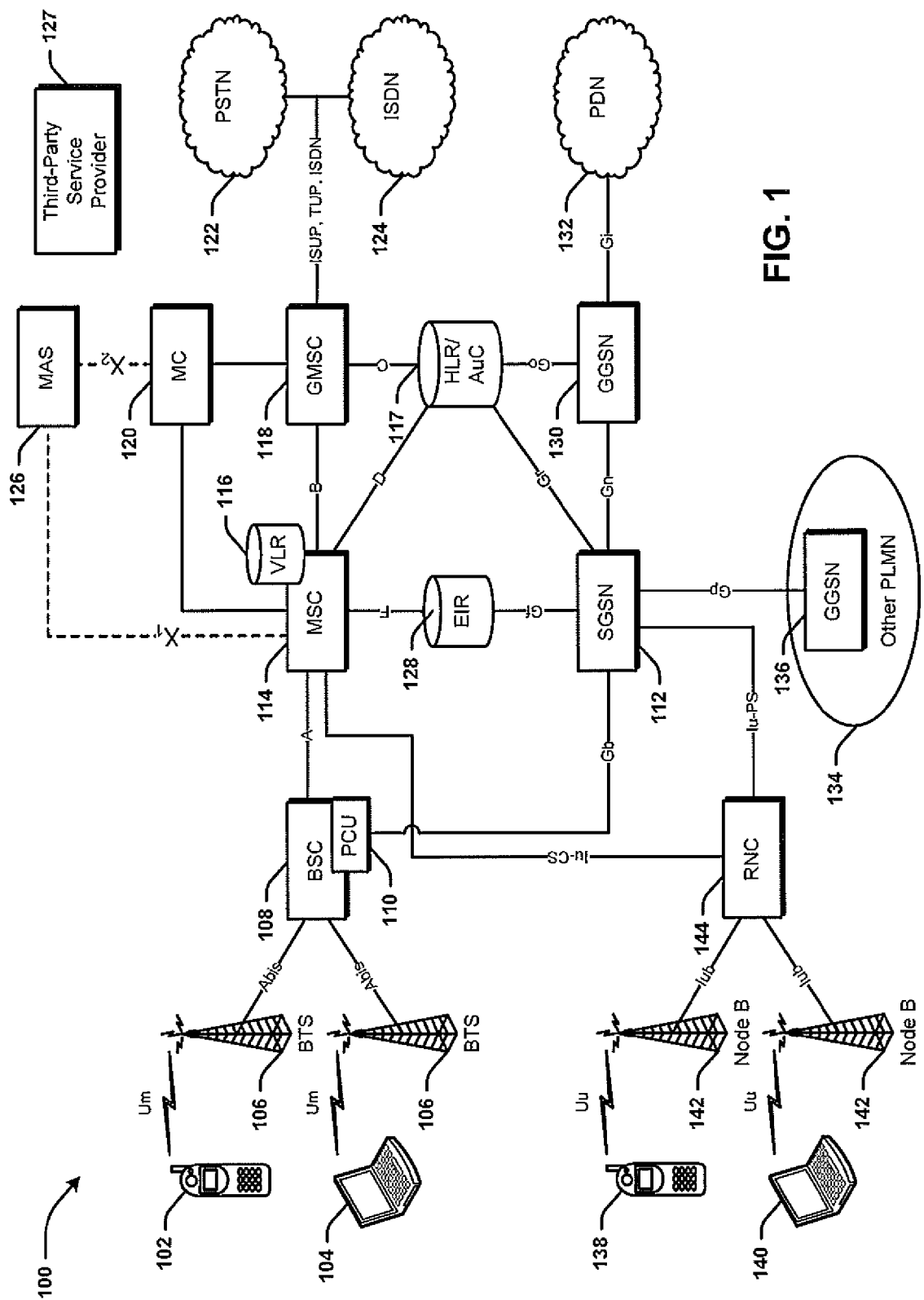
FIG. 1 illustrates an exemplary wireless telecommunications network in which the present disclosure can be implemented.

Referring now to the drawings, wherein like numerals represent like elements throughout the several views, FIG. 1 illustrates an exemplary wireless telecommunications network 100 in which the present disclosure can be implemented. The network elements and network interfaces illustrated in the wireless telecommunications network 100 are described for Global System for Mobile communications (GSM), General Packet Radio Service (GPRS), and Universal Mobile Telecommunications System (UMTS) telecommunications technologies. It should be understood, however, that the present disclosure is applicable to any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G and 3G (third generation) and above (4G and beyond) technologies. Examples of suitable data enabling bearers include GPRS, Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSPDA), Evolved HSPA (HSPA+), and various other current and future data enabling bearers.

The illustrated wireless telecommunications network 100 includes two radio access networks (RAN). A first RAN, illustrated in the upper left hand portion of FIG. 1, is dedicated to GSM-based network access. A second RAN, illustrated in the lower left hand portion of FIG. 1, is dedicated to UMTS-based network access. The present disclosure is not limited to the illustrated embodiments for GSM and UMTS network access. Other access technologies are contemplated as described above. The first RAN is described immediately below.

The illustrated wireless telecommunications network 100 includes a first mobile station (MS) 102 and a second MS 104 that are each in communication with a base transceiver station (BTS) 106 via the Um radio (air) interface. A BTS 106 is the terminating node for the radio interface in the first RAN. Each BTS 106 can include one or more transceivers and can be responsible for ciphering of the radio interface.

In the illustrated embodiment, the first MS 102 is a mobile phone and the second MS 104 is a portable computer, such as a laptop with an integrated or external, removable GSM access card. Each MS 102, 104 can include mobile equipment, such as, but not limited to, keyboards, screens, touch screens, multi-touch screens, radio transceivers, circuit boards, processors, memory, a subscriber identity module (SIM) that contains subscriber information to enable network access to the wireless telecommunications network 100, and the like.

Each BTS 106 is in communication with a base station controller (BSC) 108 via the Abis interface. The BSC 108 is configured to allocate radio resources to the MS's 102, 104, administer frequencies, and control handovers between BTS's 106 (and others not shown). Although illustrated as a distinct element, the BSC 108 functions can be incorporated in the BTS 106 and the Abis interface can be eliminated.

The BSC 108 can be logically associated with a packet control unit (PCU) 110 when GPRS capabilities are employed, such as in the illustrated wireless telecommunications network 100. The PCU 110 is configured to support radio related aspects of GPRS when connected to a GSM network. The PCU 110 is in communication with a serving GPRS support node (SGSN) 112 via the Gb interface. The SGSN 112 records and tracks the location of each mobile device (e.g., MS's 102, 104) in the wireless telecommunications network 100. The SGSN 112 also provides security functions and access control functions.

The BSC 108 is in communication with a mobile switching center (MSC) 114 via an A interface. The MSC 114 is configured to function as a telecommunications switch and is in communication with location databases, such as visiting location register (VLR) 116 and a home location register (HLR) 117. The VLR 116 can be logically associated with the MSC 114 as illustrated or can be separate from the MSC 114. The VLR 116 is a database configured to store all subscriber data that is required for call processing and mobility management for mobile subscribers that are currently located in an area controlled by the VLR 116. The HLR 117 is in communication with the MSC 114 and VLR 116 via the D interface. The HLR 117 is a database configured to provide routing information for mobile terminated (MT) calls and various messaging communications. The HLR 117 is also configured to maintain subscriber data that is distributed to the relevant VLR (e.g., the VLR 116) or the SGSN 112 through the attach process and mobility management procedures, such as location area and routing area updates. The HLR 117 can be logically associated with an authentication center (AuC) as illustrated. The AuC is configured to authenticate each SIM card that attempts to connect to the wireless telecommunications network 100, for example, when a mobile device is powered on. Once authenticated, the HLR 117 is allowed to manage the SIM and services provided to the MS 102, 104. The AuC can generate an encryption key that is used to encrypt all wireless communications between the MS 102, 104 and the wireless telecommunications network 100.

The MSC 114 is also in communication with a gateway-MSC (GMSC) 118 via the B interface. The MSC 114 is also in communication with a message center (MC) 120. The GMSC 118 is configured to provide an edge function within a public land mobile network (PLMN). The GMSC 118 terminates signaling and traffic from the public switched telephone network (PSTN) 122 and integrated service digital network (ISDN) 124, and converts the signaling and traffic to protocols employed by the mobile network. The GMSC 118 is in communication with the HLR/AuC 117 via the C interface to obtain routing information for mobile terminated calls originating from fixed network devices, such as fixed telephones that are in communication with the mobile network via the PSTN 122, for example. The MC 120 can be a short message service center (SMSC), an enhanced message service center (EMSC), and/or a multimedia message service center (MMSC), for example. Generally, the MC 120 can operate according to one or more messaging protocols defined for SMS, EMS, and/or MMS messaging services.

The MSC 114 is also in communication with a messaging anonymity system (MAS) 126 via an exemplary $X_1$ interface.

Figure 2:
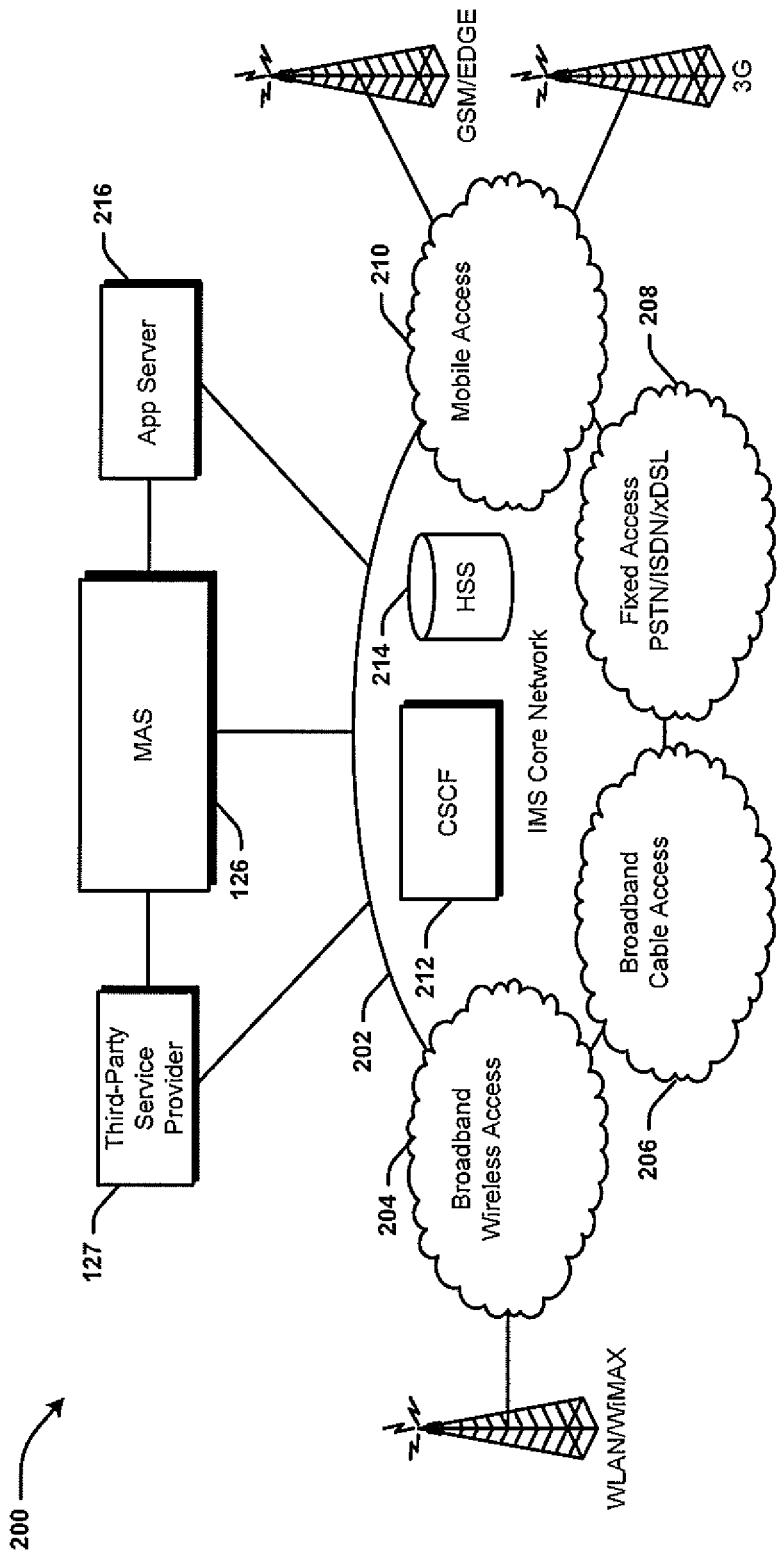
FIG. 2 illustrates an exemplary Internet protocol Multimedia Subsystem (IMS) network in which the present disclosure can be implemented

In the illustrated embodiment, the MAS 126 is a network element in the wireless telecommunications network 100. In an alternative embodiment, the MAS 126 is a network element that is in communication with an Internet protocol Multimedia Subsystem (IMS) network, as illustrated in FIG. 2. Each of these alternative embodiments is described in detail with reference to the aforementioned figures.

The MAS 126 can include hardware, software, or any combination thereof. The MAS 126 can be a stand-alone system (as shown) or can be integrated into other systems, servers, network elements, nodes, software, hardware, and the like. For example, the MAS 126 or functionality thereof can be integrated into the MSC 114, the GMSC 118, or the MC 120. The MAS 126 can also be in communication with the MC 120 via an exemplary $X_2$ interface. The MAS 126 is described in greater detail below.

In some embodiments, the MAS 126 or the functionality thereof is included in the MC 120. Upon receipt of an incoming message the MAS 126 can determine to provision an anonymous subscriber identification (ASI) to be used in lieu of the original subscriber address (e.g., telephone number, MSISDN, device URL) to protect the identity of the calling party (sending subscriber). The ASI can be a number string, a character string, or any combination thereof, and can be of any length. A specific ASI format can be defined by a wireless service provider.

It is contemplated that provisioning rules can dictate how an incoming message is processed, that is, whether the incoming message is modified so as to include an ASI instead of the original subscriber address. In some embodiments, a wireless service provider, for example, the provider of the wireless telecommunications network 100 can flag or otherwise indicate that one or more third-party service providers 127 are to only receive messages processed by the MAS 126 to include an ASI. In some embodiments, the sending subscriber can notify the wireless service provider of his/her preferences regarding specific third-party service providers 127 as to whether anonymity is desired when messaging.

A third-party service provider 127 can be, but is not limited to, any content distributor, any retailer, any online retailer, any restaurant, any vending service, any banking service, any delivery service, any other service provider whatsoever, and the like. A content distributor, for example, can include a sound distributor, a music distributor, an audio book distributor, a ringtone distributor, a ringback tone distributor, a video distributor, a movie distributor, an image distributor, a video game distributor, an application distributor, an e-book distributor, and a news feed distributor. A vending service, for example, can include a food and/or beverage vending service, an office supply vending service, a clothes vending service, a tobacco vending service, a medicine vending service, and the like. A banking service, for example, can include a service to access a banking account, such as, but not limited to, a checking account, a savings account, a money market account, a certificate of deposit account, a stock account, a retirement account, a line of credit account, a mortgage account, a credit card account, and the like. A delivery service, for example, can include a food and/or beverage delivery service, a gift delivery service, a florist delivery service, a movie delivery service, a video game delivery service, a music delivery service, an audio book delivery service, a book delivery service, a package delivery service, a rental car delivery service, and the like.

In some embodiments, the MAS 126 or functionality thereof is integrated into a mobile switching center, such as the MSC 114 or the GMSC 118. Incoming messages can be processed as described above and sent to the MC 120 for storage until a messaging channel becomes available, at which point the MC 120 can forward the message with the subscriber identity being used as the originating address instead of the original subscriber address.

In some embodiments, the MAS 126 can be configured to intercept a message and process the message for delivery to a third-party service provider 127 according to provisioning rules that can be set by a subscriber, the wireless service provider, or other entity, for example. A message can be intercepted at the MSC 114, GMSC 118, MC 120, or other network element. Alternatively, the MC 120 can communicate with the MAS 126 for instructions on how to modify a received message according to provisioning rules stored in the MAS 126.

The illustrated third-party service provider 127 is not illustrated as being in communication with any particular network node or element. As such, it is contemplated that a third-party service provider 127 can be in communication with the wireless telecommunications network 100 via the PSTN 122, the ISDN 124, the PDN 132 (e.g., the Internet), or via any network node or element illustrated. In some embodiments, the third-party service provider 127 is in communication with the wireless telecommunications network 100 via a network gateway (not illustrated), for example.

The MSC 114 is also in communication with an equipment identity register (EIR) 128 via an F interface. The EIR 128 is a database that can be configured to identify subscriber devices that are permitted to access the wireless telecommunications network 100. An International Mobile Equipment Identity (IMEI) is a unique identifier that is allocated to each mobile equipment and can be used to identify subscriber devices in the EIR 128. The IMEI includes a type approval code, a final assembly code, a serial number, and a spare digit. An IMEI is typically placed in the EIR 128 once its operation has been certified for the infrastructure in a laboratory or validation facility.

The EIR 128 and the HLR/AuC 117 are each in communication with the SGSN 112 via the Gf interface and the Gr interface, respectively. The SGSN 112, in turn, is in communication with a gateway GPRS support node (GGSN) 130 via the Gn interface. The GGSN 130 is configured to provide an edge routing function within a GPRS network to external packet data networks (PDN) 132, such as the Internet and one or more intranets, for example. The GGSN 130 is in communication with the PDN 132 via the Gi interface. The GGSN 130 can include firewall and filtering functionality. The HLR/AuC 117 can be in communication with the GGSN 130 via the Gc interface.

The SGSN 112 is also in communication with another PLMN 134 via an external GGSN 136. The external GGSN 136 provides access to the other PLMN 134 that can be, for example, a wireless telecommunications network operated by another wireless service provider the same wireless service provider.

The second RAN, illustrated in the lower left hand portion of FIG. 1, is dedicated to UMTS-based network access and is now described. The illustrated wireless telecommunications network 100 also includes a first user equipment (UE) 138 and a second UE 140 that are each in communication with a Node B 142 via the Uu radio (air) interface. A Node B 142 is the terminating node for the radio interface in the second RAN. Each Node B 142 can include one or more transceivers for transmission and reception of data across the radio interface. Each Node B 142 is configured to apply the codes to describe channels in a CDMA-based UMTS network. Generally, the Node B 142 performs similar functions for the UMTS network that the BTS 106 performs for the GSM network.

In the illustrated embodiment, the first UE 138 is a mobile phone and the second UE 140 is a portable computer, such as a laptop with an integrated or external, removable UMTS card. Each UE 138, 140 can include mobile equipment, such as keyboards, screens, touch screens, multi-touch screens, radio transceivers, circuit boards, processors, a SIM/universal SIM (USIM) that contains subscriber information to enable network access to the wireless telecommunications network 100, and the like. Generally, the UE's 138, 140 perform similar functions for the UMTS network that the MS's 102, 104 perform for the GSM network.

Each Node B 142 is in communication with a radio network controller (RNC) 144 via the Iub interface. The RNC 144 is configured to allocate radio resources to the UE's 138, 140, administer frequencies, and control handovers between Node B's 142 (and others not shown). Although illustrated as a distinct element, the RNC 144 functions can be located with the Node B's 142. In this embodiment, the Iub interface is eliminated. Generally, the RNC 144 performs similar functions for the UMTS network that the BSC 108 performs for the GSM network.

The RNC 144 is in communication with the MSC 114 via an Iu-CS interface. The RNC 144 is also in communication with the SGSN 112 via an Iu-PS interface. The other network elements perform the same functions for the UMTS network as described above for the GSM network.

Referring now to FIG. 2, an exemplary Internet protocol Multimedia Subsystem (IMS) network 200 in which the present disclosure can be implemented is illustrated. The IMS network 200 includes an IMS core network 202 and a several access networks 204, 206, 208, 210. The IMS core network 202 primarily includes a call session control function (CSCF) 212 and a home subscriber server (HSS) 214 as illustrated, although other elements, not illustrated, are contemplated. The CSCF 212 facilitates session initiation protocol (SIP) session control for SIP session setup and SIP session teardown. The CSCF 212 communicates with the HSS 214. The HSS 214 acts as the master database of subscribers and is configured to function similar to the HLR/AuC 117.

The CSCF 212 can be divided into three logical divisions (not shown) including a proxy-CSCF (P-CSCF), an interrogating-CSCF (I-CSCF), and a serving-CSCF (S-CSCF). The P-CSCF operates as the entry point in the IMS core network 202. The P-CSCF is configured to forward SIP messages received from a device that is in communication with one of the access networks 204, 206, 208, 210. The SIP messages can be sent to the I-CSCF or S-CSCF depending on the type of message and intended action. The P-CSCF is also configured to generate call detail records. The I-CSCF is configured to register, route and forward SIP messages within the IMS core network 202. The S-CSCF is configured to manage device registrations, maintain sessions, interact with other services, perform charging functions, and provide security.

The access networks can include, as illustrated, a broadband wireless access network 204, such as wireless local area network (WLAN) and WiMax networks, a broadband cable access network 206, such as cable Internet provider networks, a fixed access network 208, such as the PSTN 122, the ISDN 124, and an xDSL network, and a mobile access network 210, such as 2G and 3G networks including the wireless telecommunications network 100, for example.

The IMS core network 202 is in communication with a MAS 126. The MAS 126, in turn, is in communication with a third-party service provider 127 and an application server 216. The application server 216 can be configured to operate as a messaging center, emulating an SMSC or MMSC, for example. Alternatively, the MAS 126 can communicate with a legacy network messaging center, such as the MC 120 to provide messaging capabilities in the IMS network 200. Presently, a few IMS messaging solutions are available and others are in development or are slotted for future development. Any IMS messaging solution can be used to implement the various features of the present disclosure described herein.

In some embodiments, the MAS 126 or the functionality thereof is included in the IMS core network 202 or the application server 216. Upon receipt of an incoming message the MAS 126 can determine to provision an ASI to be used in lieu of the original subscriber address (e.g., telephone number, MSISDN, device URL) to protect the identity of the calling party (sending subscriber). It is contemplated that provisioning rules can dictate how an incoming message is processed, that is, whether the incoming message is modified so as to include an alias (the ASI) instead of the original subscriber address. In some embodiments, a service provider, for example, the provider of an access network 204, 206, 208, 210 can flag or otherwise indicate that one or more third-party service providers 127 are to only receive messages processed by the MAS 126 to include an ASI in an effort to maintain the anonymity of the sending subscriber. In some embodiments, the sending subscriber can notify the IMS service provider of his/her preferences regarding anonymous messaging when communicating with one or more third-party service providers 127.

In some embodiments, the MAS 126 can be configured to intercept a message and process the message for delivery to a third-party service provider 127 according to provisioning rules that can be set by a subscriber, an application provider, an access network provider, an IMS network provider, or other entity, for example.

Figure 3:
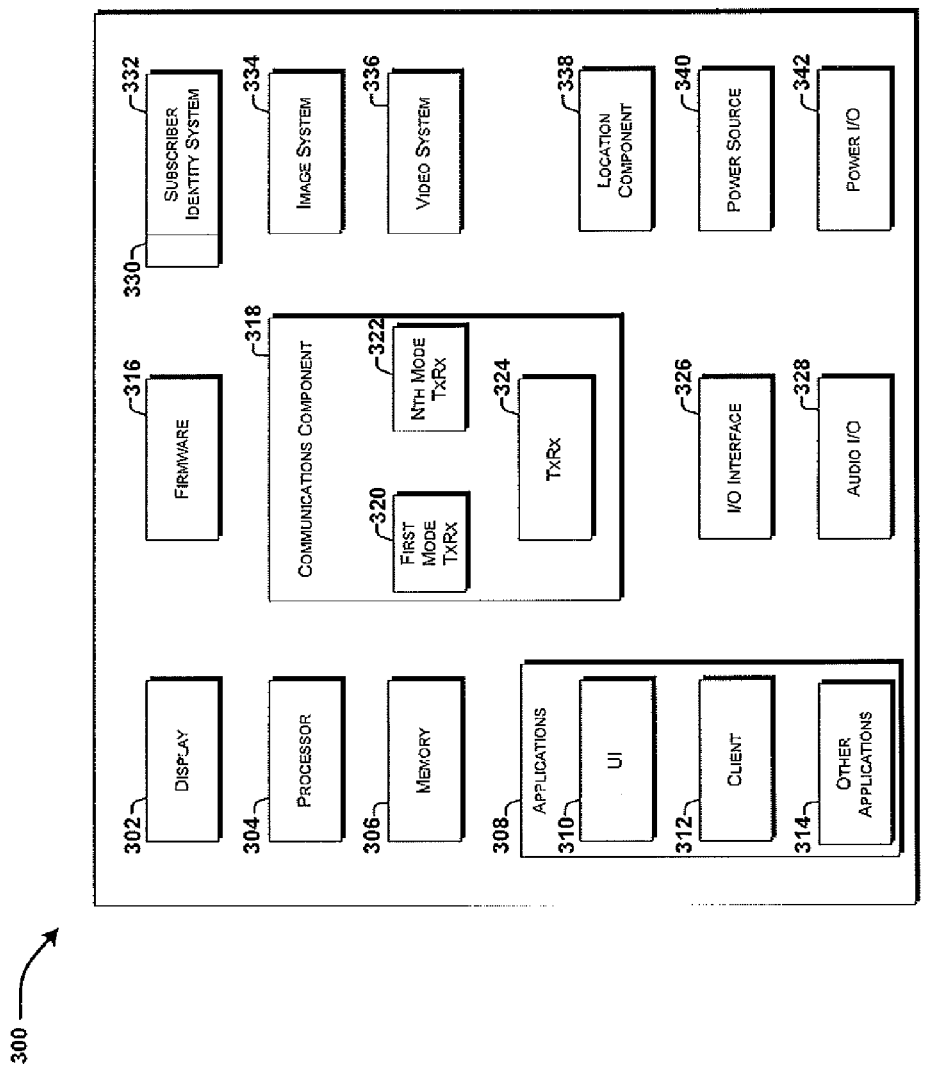
FIG. 3 illustrates a mobile device and components thereof, according to an exemplary embodiment of the present disclosure.

FIG. 3 illustrates a schematic block diagram of an exemplary device 300, such as, the MSs 102, 104 or the UEs 138, 140 for use in accordance with some exemplary embodiments of the present disclosure. Although no connections are shown between the components illustrated in FIG. 3, the components can interact with each other to carry out device functions.

It should be understood that FIG. 3 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 300 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 300.

The device 300 can include a display 302 for displaying multimedia such as, for example, text, images, video, telephony functions such as Caller ID data, setup functions, menus, music, metadata, messages, wallpaper, graphics, Internet content, device status, preferences settings, map and location data, and the like. The device 300 can include a processor 304 for controlling, and/or processing data. A memory 306 can interface with the processor 304 for the storage of data and/or applications 308.

An application 308 can include, for example, SMS messaging software, EMS messaging software, MMS messaging software, and the like. The application 308 can also include a user interface (UI) application 310. The UI application 310 can interface with a client 312 (e.g., an operating system) to facilitate user interaction with device functionality and data, for example, entering message content, viewing received messages, answering/initiating calls, entering/deleting data, password entry and setting, configuring settings, address book manipulation, and the like. The applications 308 can include other applications 314 such as, for example, add-ons, plug-ins, email applications, music applications, video applications, camera applications, location-based service (LBS) applications, power conservation applications, combinations thereof, and the like, as well as subsystems and/or components. The applications 308 can be stored in the memory 306 and/or in a firmware 316, and can be executed by the processor 304. The firmware 316 can also store code for execution during initialization of the device 300.

A communications component 318 can interface with the processor 304 to facilitate wired/wireless communications with external systems including, for example, cellular networks, location systems, VoIP networks, local area networks (LAN's), wide area networks (WAN's), metropolitan area networks (MAN's), personal area networks (PAN's), and other networks, which can be implemented using WIFI®, WIMAX™, combinations and/or improvements thereof, and the like. The communications component 318 can also include a multimode communications subsystem for providing cellular communications via different cellular technologies. For example, a first cellular transceiver 320 can operate in one mode, for example, GSM, and an Nth transceiver 322 can operate in a different mode, for example UMTS. While only two transceivers 320, 322 are illustrated, it should be appreciated that a plurality of transceivers can be included. The communications component 318 can also include a transceiver 324 for other communications technologies such as, for example, WIFI®, WIMAX™, BLUETOOTH®, infrared, IRDA, NFC, RF, and the like. The communications component 318 can also facilitate reception from terrestrial radio networks, digital satellite radio networks, Internet-based radio services networks, combinations thereof, and the like. The communications component 318 can process data from a network such as, for example, the Internet, a corporate intranet, a home broadband network, a WIFI® hotspot, and the like, via an ISP, DSL provider, or broadband provider.

An input/output (I/O) interface 326 can be provided for input/output of data and/or signals. The I/O interface 326 can be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCDs), combinations thereof, and the like. It should be appreciated that the I/O interface 326 can be used for communications between the device and a network or local device, instead of, or in addition to, the communications component 318.

Audio capabilities can be provided by an audio I/O component 328 that can include a speaker for the output of audio signals and a microphone to collect audio signals. The device 300 can include a slot interface 330 for accommodating a subscriber identity system 332 such as, for example, a SIM or universal SIM (USIM). The subscriber identity system 332 instead can be manufactured into the device 300, thereby obviating the need for a slot interface 330. In some embodiments, the subscriber identity system 332 can store certain features, user characteristics, rules, policies, models, and the like. The subscriber identity system 332 can be programmed by a manufacturer, a retailer, a user, a computer, a network operator, and the like.

The device 300 can include an image capture and processing system 334 (image system). Photos and/or videos can be obtained via an associated image capture subsystem of the image system 334, for example, a camera. The device 300 can also include a video system 336 for capturing, processing, recording, modifying, and/or transmitting video content.

A location component 338, can be included to send and/or receive signals such as, for example, GPS data, A-GPS data, WIFI®/WIMAX™ and/or cellular network triangulation data, combinations thereof, and the like. The location component 338 can interface with cellular network nodes, telephone lines, satellites, location transmitters and/or beacons, wireless network transmitters and receivers, for example, WIFI® hotspots, radio transmitters, combinations thereof, and the like. The device 300 can obtain, generate, and/or receive data to identify its location, or can transmit data used by other devices to determine the device 300 location. The device 300 can include a power source 340 such as batteries and/or other power subsystem (AC or DC). The power source 340 can interface with an external power system or charging equipment via a power I/O component 342.

Figure 4:
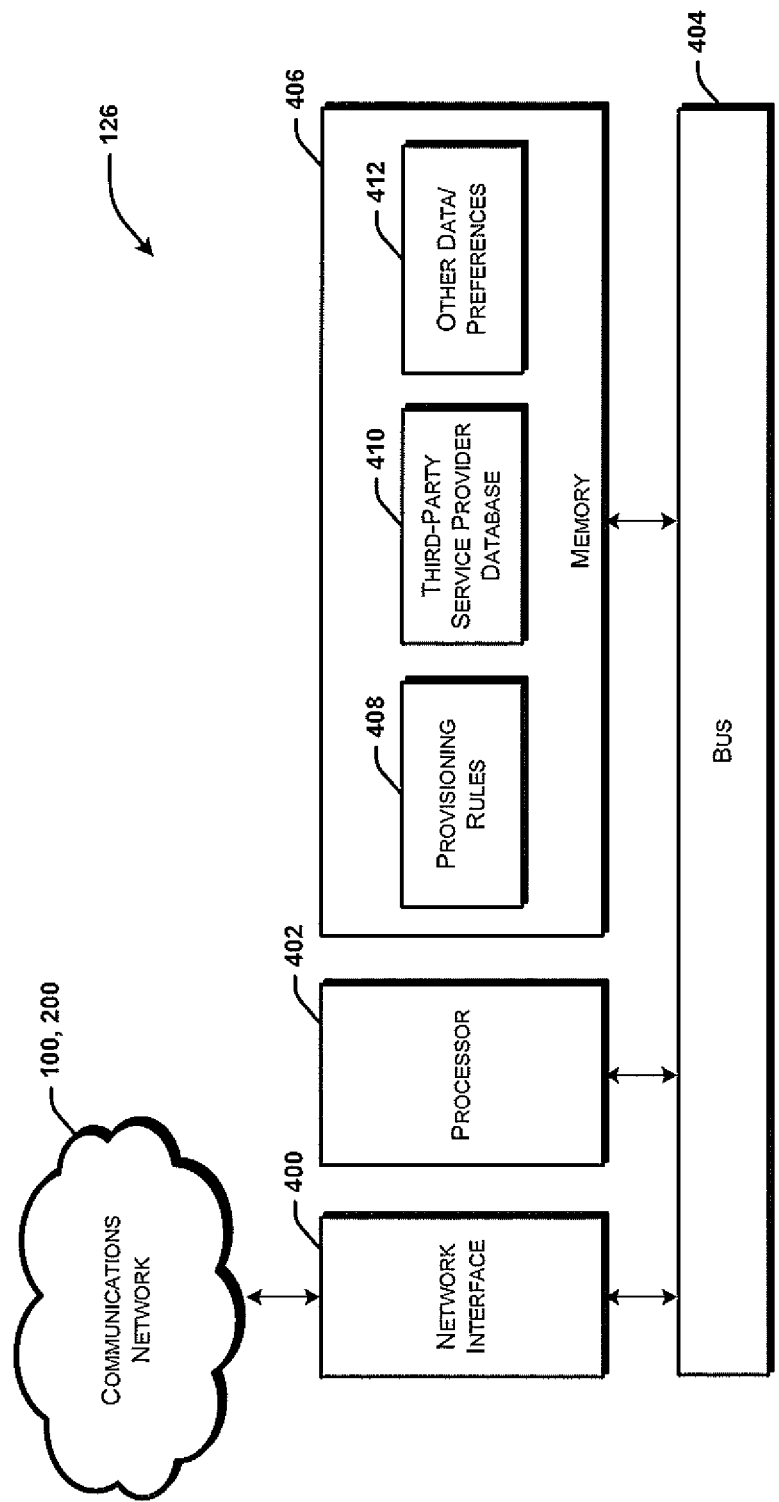
FIG. 4 illustrates a messaging anonymity system (MAS) and components thereof, according to an exemplary embodiment of the present disclosure.

FIG. 4 schematically illustrates a block diagram of an MAS 126 according to an exemplary embodiment of the present disclosure. The MAS 126 can be a combination of hardware and software, and can exist as a node on a communications network, such as the wireless telecommunications network 100 and/or the IMS network 200. The illustrated MAS 126 includes one or more network interfaces 400 that are operatively linked and in communication with one or more processors 402 via one or more data/memory busses 404. The network interface 400 can be used to allow the MAS 126 to communicate with one or more components of the communications network 100, 200 or any device (e.g. device 300) connected thereto or residing thereon. The processor 402 is operatively linked and in communication with a memory 406 via the data/memory bus 404.

The word "memory," as used herein to describe the memory 406, collectively includes all memory types associated with the MAS 126 such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory 406 is illustrated as residing proximate the processor 402, it should be understood that the memory 406 can be a remotely accessed storage system, for example, a server on the PDN 132 (e.g. the Internet), a remote hard disk drive, a removable storage medium, combinations thereof, and the like. Moreover, the memory 406 is intended to encompass network memory and/or other storage devices in wired or wireless communication with the MAS 126, which may utilize the network interface 400 to facilitate such communication. Thus, any of the rules, data, applications, and/or software described below can be stored within the memory 406 and/or accessed via network connections to other data processing systems (not shown) that may include a local area network (LAN), a metropolitan area network (MAN), or a wide area network (WAN), for example. Accordingly, the present disclosure may operate on the MAS 126, wherein the MAS 126 is configured as a server to one or more client data processing systems as dictated by a client/server model. It should be appreciated that the memory 406 can also be a storage device associated with the device 300. The illustrated memory 406 can include one or more provisioning rules 408, a third-party service provider database 410, and/or other data 412 (e.g., preferences).

The provisioning rules 408 can include rules used by the MAS 126 in determining to provision an ASI to be used in lieu of a subscriber address that is associated with a subscriber's mobile device (e.g., device 300). Provisioning rules 408 can be defined for one or more third-party service providers identified in the third-party service provider database 410. Provisioning rules 408 can be defined to randomly assign an ASI for use in the present messaging communication or one or more future messaging communications between the device 300 and a third-party service provider. Provisioning rules 408 can also be defined based upon ASI selection criteria provided by the wireless service provider, the subscriber, or other entity. Preferences can be stored as the illustrated other data 412. Provisioning rules 408 can be defined to use an ASI for a temporary time period or can be defined permanently.

It is contemplated that the MAS 126 can be configured to store applications to perform steps of the methods described herein below. Applications can include, for example, programs, routines, subroutines, algorithms, software, tools, and the like. For example, applications can include a user interface application for allowing a user, such as a network technician, to define provisioning rules 408 for ASI's as related to various third-party service providers.

Figure 5:
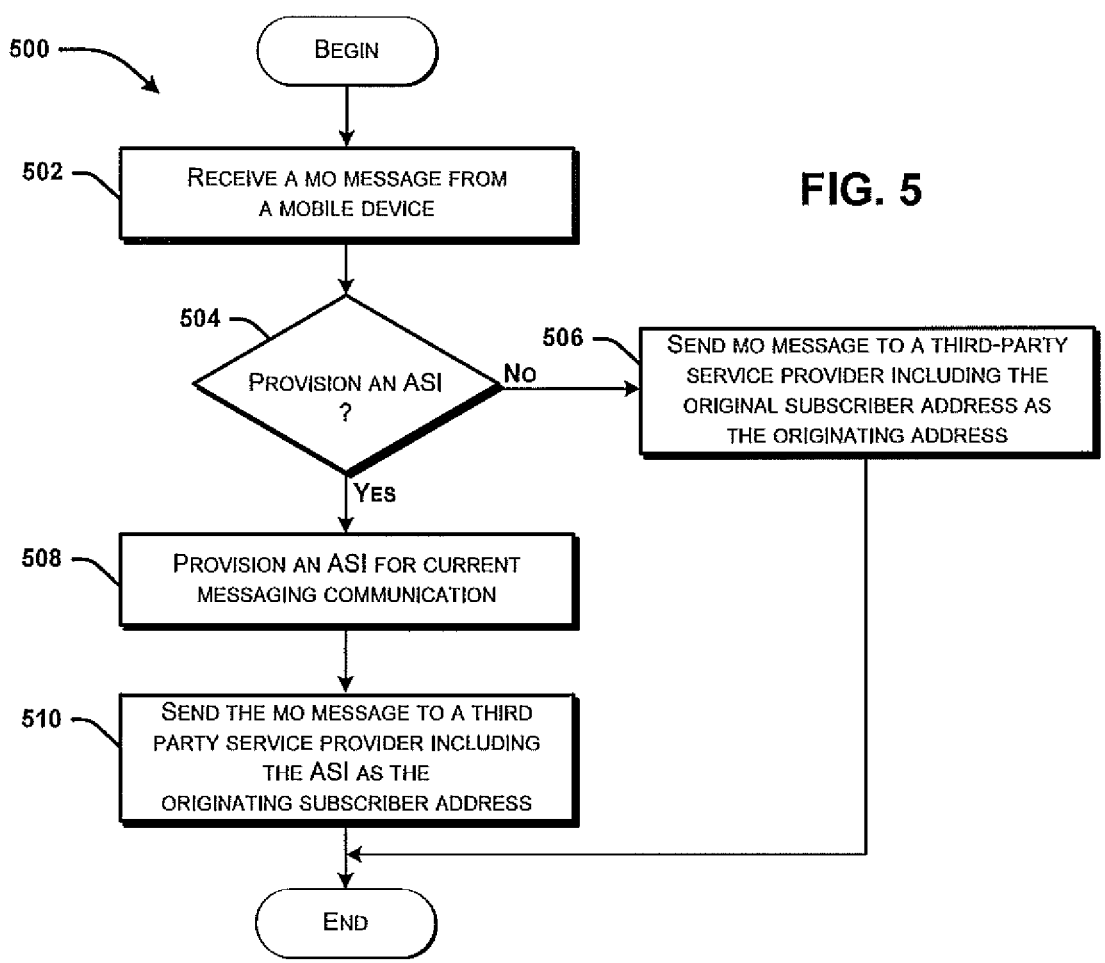
FIG. 5 illustrates a method for operating an MAS, according to an exemplary embodiment of the present disclosure.

Referring now to FIG. 5, a method 500 for operating an MAS 126 is illustrated, according to exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

The method 500 begins and flow proceeds to block 502 wherein the MAS 126 receives a mobile-originated (MO) message from a mobile device 300. At decision block 504, the MAS 126 can determine whether to provision an ASI for the MO message. The MAS 126 can make this determination based upon provisioning rules 408, for example.

In some embodiments, the MAS 126 can identify one or more third-party service providers that are viewed as legitimate or illegitimate based upon the provisioning rules 408. The legitimacy of a third-party service provider can be contingent upon agreements between the wireless service provider and a third-party service provider 127 to protect the identities of a wireless service provider's subscribers. For example, a subscriber can be offered an option to opt-out of allowing their subscriber address (e.g., telephone number, MSISDN, device URL) to be shared with parties when messaging. In some instances messages that are received at a subscriber's device are not provoked. That is, the subscriber did not request to receive a message from the third-party service provider 127. Out of curiosity or otherwise, the subscriber may respond unbeknownst to them that the third-party service provider 127 is not providing a legitimate service, rather is phishing for sensitive subscriber data, such as a subscriber's telephone or other subscriber address. Accordingly, the present disclosure provides protection in this and other instances in which a subscriber address should not be shared with a third-party service provider 127.

If it is determined at block 504 that an ASI is not to be provisioned for the MO message, the MAS 126 can allow the message to pass-through with the original subscriber address as the originating address, at block 506. The method 500 can end.

If it is determined at block 504 that an ASI is to be provisioned for the MO message, the MAS 126 can provision an ASI for the current messaging communication, at block 508. At block 510, the MAS 126 can send the MO message to a third-party service provider including the ASI as the originating subscriber address. The method 500 can end.

Figure 6:
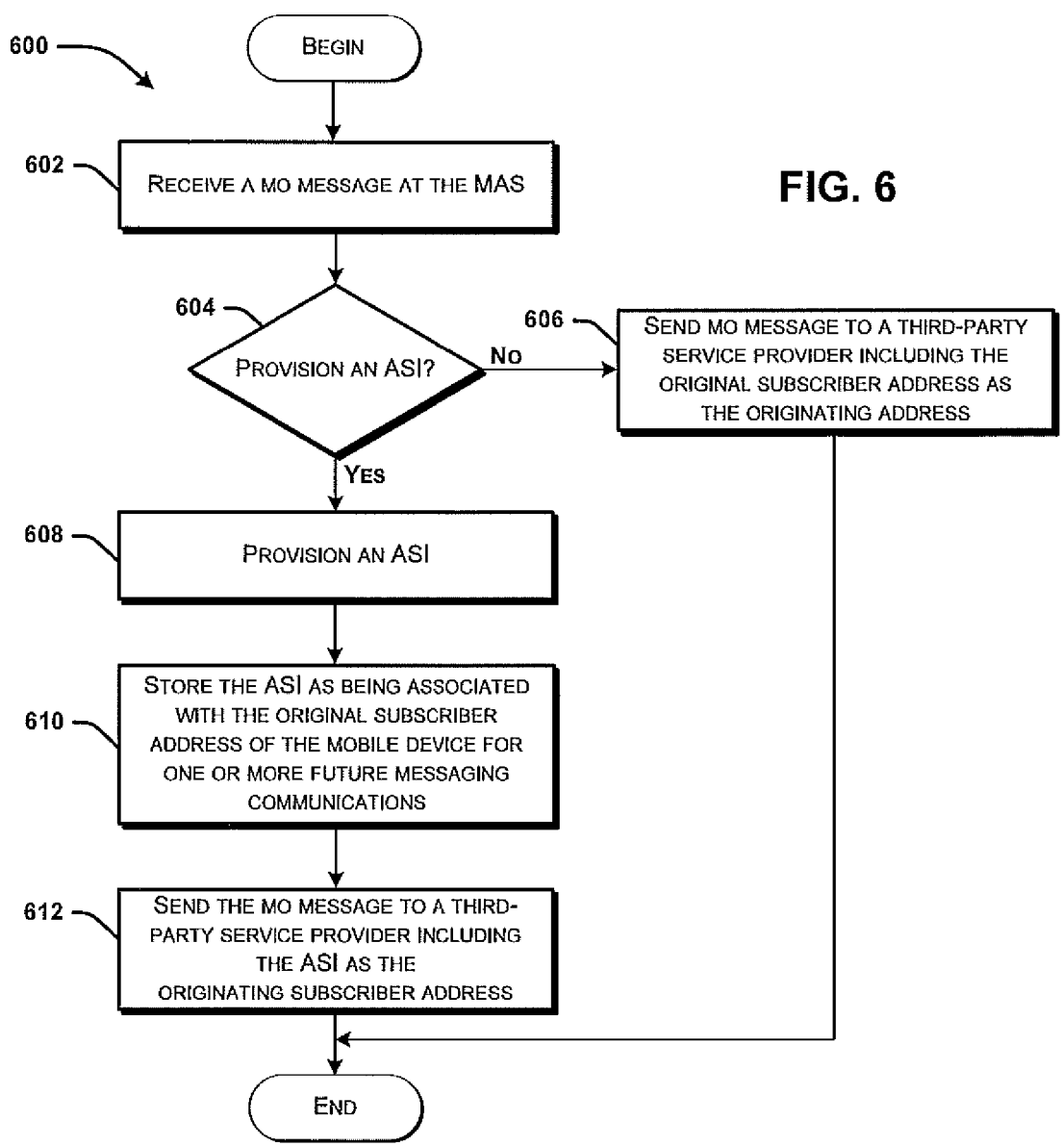
FIG. 6 illustrates a method for operating an MAS, according to another exemplary embodiment of the present disclosure.

Referring now to FIG. 6, a method 600 for operating an MAS 126 is illustrated, according to another exemplary embodiment of the present disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

The method 600 begins and flow proceeds to block 602 wherein the MAS 126 receives an MO message from a mobile device 300. At decision block 604, the MAS 126 can determine whether to provision an ASI for the MO message. The MAS 126 can make this determination based upon provisioning rules 408.

If it is determined at block 604 that an ASI is not to be provisioned for the MO message, the MAS 126 can allow the message to pass-through with the original subscriber address as the originating address, at block 606. The method 600 can end.

If it is determined at block 604 that an ASI is to be provisioned for the MO message, the MAS 126 can provision an ASI, at block 608. At block 610, the MAS 126 can store the ASI as being associated with the original subscriber address of the mobile device for one or more future messaging communications. At block 612, the MAS 126 can send the MO message to a third-party service provider 127 including the ASI as the originating subscriber address. The method 600 can end.

Figure 7:
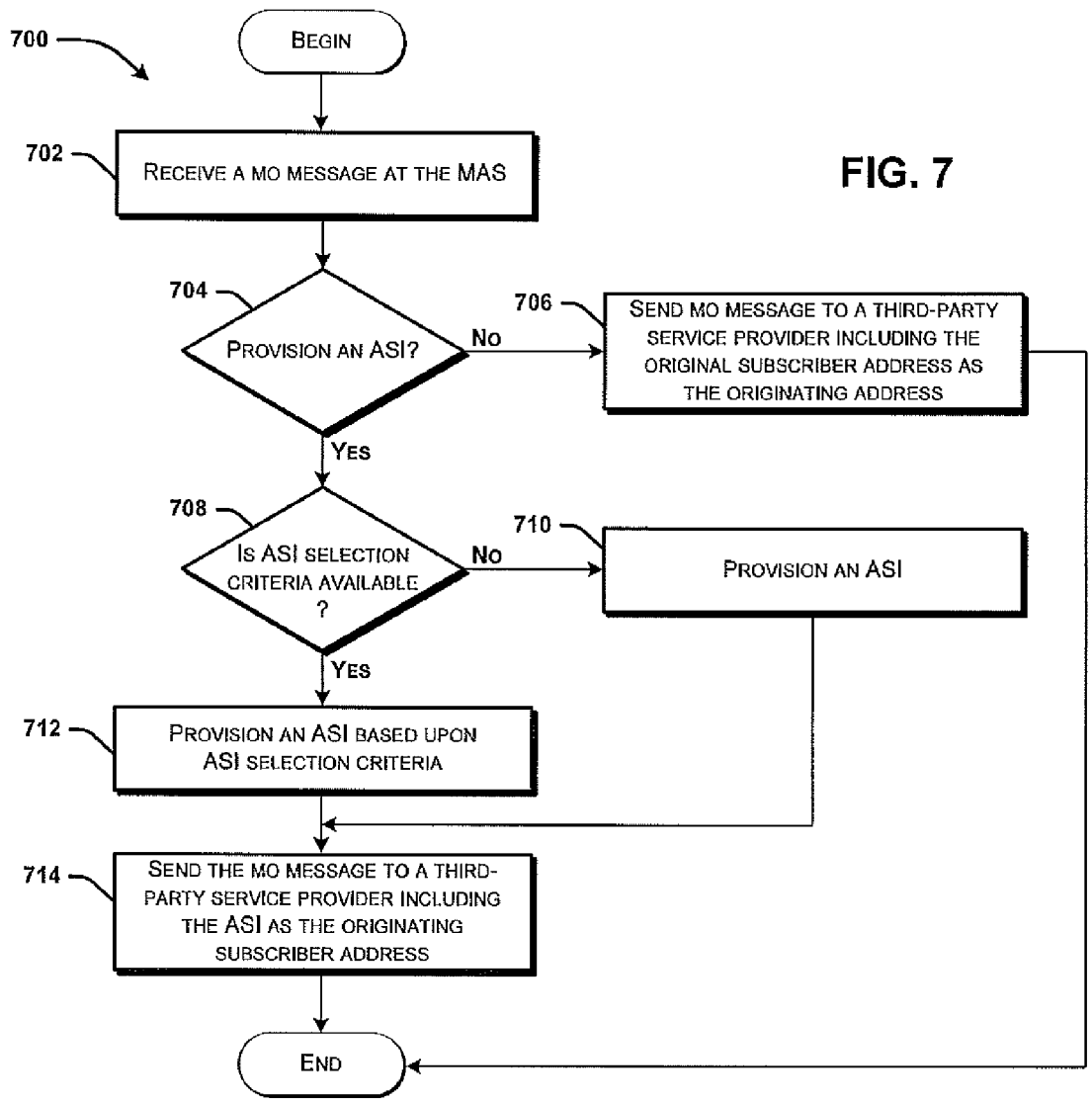
FIG. 7 illustrates a method for operating an MAS, according to another exemplary embodiment of the present disclosure.

Referring now to FIG. 7, a method 700 for operating an MAS 126 is illustrated, according to another exemplary embodiment of the present disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The method 700 begins and flow proceeds to block 702 wherein the MAS 126 receives a MO message from a mobile device 300. At decision block 704, the MAS 126 can determine whether to provision an ASI for the MO message. The MAS 126 can make this determination based upon provisioning rules 408.

If it is determined at block 704 that an ASI is not to be provisioned for the MO message, the MAS 126 can allow the message to pass-through with the original subscriber address as the originating address, at block 706. The method 700 can end.

If it is determined at block 704 that an ASI is to be provisioned for the MO message, flow can proceed to block 708 wherein the MAS 126 can determine whether to provision the ASI based upon ASI selection criteria provided by the wireless service provider, a subscriber, or other entity, for example. If it is determined at block 708 that an ASI is not to be provisioned for the MO message based upon ASI selection criteria, the MAS 126 can provision an ASI according to other provisioning rules, at block 710. If it is determined at block 708 that an ASI is to be provisioned for the MO message based upon ASI selection criteria, the MAS 126 can provision an ASI based upon the ASI selection criteria, at block 712.

Following either of the above cases, at block 714, the MAS 126 can send the MO message to a third-party service provider 127 including the ASI as the originating subscriber address. The method 700 can end.

Figure 8:
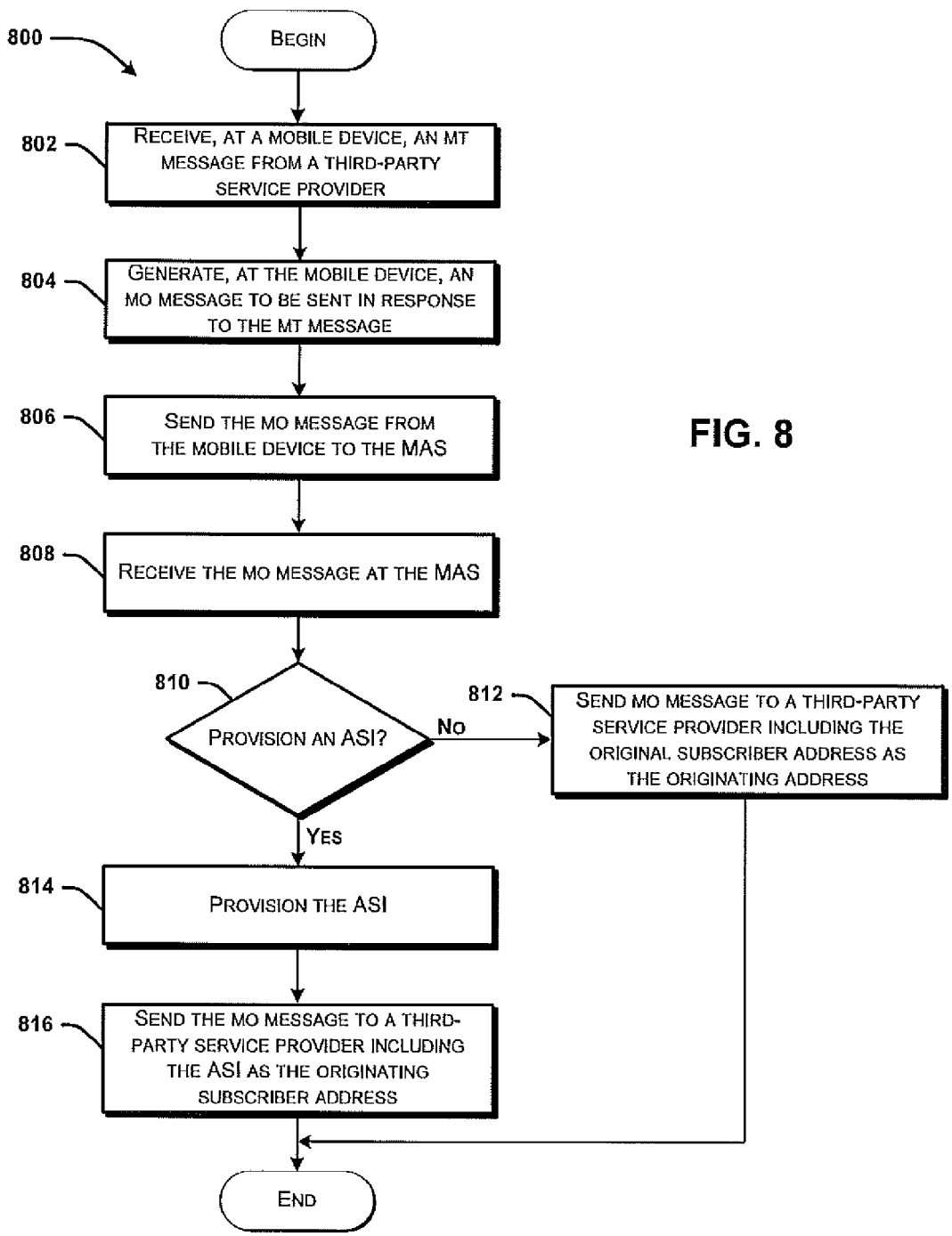
FIG. 8 illustrates a method for operating an MAS, according to another exemplary embodiment of the present disclosure.

Referring now to FIG. 8, a method 800 for operating an MAS 126 is illustrated, according to another exemplary embodiment of the present disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

The method 800 begins and flow proceeds to block 802 wherein a mobile device 300 receives a mobile-terminated (MT) message from a third-party service provider 127. At block 804, the mobile device 300 generates a MO message to be sent in response to the MT message. In some embodiments, the MO message is generated automatically in response to the MT message being received. In some embodiments, the MO message is automatically generated based upon subscriber preferences to automatically respond to messages received from certain third-party service providers 127. In some embodiments, the MO message is provoked to generation by the MT message resulting in a spontaneous response message to the third-party service provider 127, sometimes unbeknownst to the subscriber.

At block 806, the mobile device 300 sends the MO message to the MAS 126. At block 808 wherein the MAS 126 receives the MO message from the mobile device 300. At decision block 810, the MAS 126 can determine whether to provision an ASI for the MO message. The MAS 126 can make this determination based upon provisioning rules 408.

If it is determined at block 810 that an ASI is not to be provisioned for the MO message, the MAS 126 can allow the message to pass-through with the original subscriber address as the originating address, at block 812. The method 800 can end.

If it is determined at block 810 that an ASI is to be provisioned for the MO message, the MAS 126 can provision an ASI, at block 814. At block 816, the MAS 126 can send the MO message to a third-party service provider 127 including the ASI as the originating subscriber address. The method 800 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   receiving, by a processor in a messaging anonymity system, a mobile-originated message from a mobile device, the mobile-originated message being destined for a third-party service provider;
   determining, by the processor in the messaging anonymity system, whether an anonymous subscriber identification should be provisioned to be used in lieu of a subscriber address that is associated with the mobile device, based on provisioning rules defined for the third-party service provider;
   responsive to a determination that the anonymous subscriber identification should be provisioned:
      provisioning automatically the anonymous subscriber identification to be used in lieu of the subscriber address associated with the mobile device by randomly assigning the anonymous subscriber identification, the anonymous subscriber identification randomly assigned is used in a future messaging communication conducted between the mobile device and the third-party service provider; and
      sending the mobile-originated message to the third-party service provider, the anonymous subscriber identification being presented to the third-party service provider as the subscriber address associated with the mobile device; and
   responsive to a determination that the anonymous subscriber identification should not be provisioned, sending the mobile-originated message to the third party service provider and presenting an originating subscriber address of the mobile device as the subscriber address associated with the mobile device.

2. The method of claim 1, wherein the mobile-originated message is sent by the mobile device in response to a mobile-terminated message from the third-party service provider being received at the mobile device.

3. The method of claim 1, wherein the mobile-originated message received from the mobile device is a spontaneous message.

4. The method of claim 1, wherein assigning the anonymous subscriber identification is based upon anonymous subscriber identification selection criteria.

5. The method of claim 4, wherein the anonymous subscriber identification selection criteria comprises at least one of a wireless communications service provider preference and a subscriber preference.

6. A system, comprising:
a processor; and
a memory having stored thereon instructions that, when executed by the processor, cause the processor to perform operations comprising:
receiving a mobile-originated message from a mobile device, the mobile-originated message being destined for a third-party service provider;
determining whether an anonymous subscriber identification should be provisioned to be used in lieu of a subscriber address that is associated with the mobile device, based on provisioning rules defined for the third-party service provider;
responsive to a determination that the anonymous subscriber identification should be provisioned:
provisioning automatically the anonymous subscriber identification to be used in lieu of the subscriber address associated with the mobile device by randomly assigning the anonymous subscriber identification, the anonymous subscriber identification randomly assigned is used in a future messaging communication conducted between the mobile device and the third-party service provider; and
sending the mobile-originated message to the third-party service provider, the anonymous subscriber identification being presented to the third-party service provider as the subscriber address associated with the mobile device; and
responsive to a determination that the anonymous subscriber identification should not be provisioned, sending the mobile-originated message to the third-party service provider and presenting an originating subscriber address of the mobile device as the subscriber address associated with the mobile device.

7. The system of claim 6, wherein the mobile-originated message is sent by the mobile device in response to a mobile-terminated message received from the third-party service provider at the mobile device.

8. The system of claim 6, wherein the mobile-originated message received from the mobile device is a spontaneous message.

9. The system of claim 6, wherein assigning the anonymous subscriber identification is based upon anonymous subscriber identification selection criteria.

10. The system of claim 9, wherein the anonymous subscriber identification selection criteria comprises at least one of a wireless communications service provider preference and a subscriber preference.

11. A non-transitory computer-readable medium comprising computer executable instructions that, when executed by a processor in a messaging anonymity system, cause the processor to perform operations comprising:
receiving a mobile-originated message from a mobile device, the mobile originated message being destined for a third-party service provider;
determining whether an anonymous subscriber identification should be provisioned to be used in lieu of a subscriber address that is associated with the mobile device, based on provisioning rules defined for the third-party service provider;
responsive to a determination that the anonymous subscriber identification should be provisioned:
provisioning automatically the anonymous subscriber identification to be used in lieu of the subscriber address associated with the mobile device by randomly assigning the anonymous subscriber identification, the anonymous subscriber identification randomly assigned is used in a future messaging communication conducted between the mobile device and the third-party service provider; and
sending the mobile-originated message to the third-party service provider, the anonymous subscriber identification being presented to the third-party service provider as the subscriber address associated with the mobile device; and
responsive to a determination that the anonymous subscriber identification should not be provisioned, sending the mobile-originated message to the third party service provider and presenting an originating subscriber address of the mobile device as the subscriber address associated with the mobile device.

12. The non-transitory computer-readable medium of claim 11, wherein the mobile-originated message received from the mobile device is a spontaneous message.

13. The non-transitory computer-readable medium of claim 11, wherein assigning the anonymous subscriber identification is based upon anonymous subscriber identification selection criteria.

14. The non-transitory computer-readable medium of claim 13, wherein the anonymous subscriber identification selection criteria comprises at least one of a wireless communications service provider preference and a subscriber preference.

* * * * *